United States Patent [19]
Fujimoto et al.

[11] Patent Number: 6,118,114
[45] Date of Patent: Sep. 12, 2000

[54] IMAGE SENSOR AND IMAGE READING APPARATUS

[75] Inventors: Hisayoshi Fujimoto; Hiroaki Onishi; Toshihiko Takakura; Norihiro Imamura, all of Kyoto, Japan

[73] Assignee: Rohm Co., Ltd., Kyoto, Japan

[21] Appl. No.: 09/065,360

[22] Filed: Apr. 23, 1998

[30] Foreign Application Priority Data

| Apr. 25, 1997 | [JP] | Japan | 9-109113 |
| Aug. 29, 1997 | [JP] | Japan | 9-234379 |
| Oct. 9, 1997 | [JP] | Japan | 9-277463 |

[51] Int. Cl.⁷ ............................ H04N 1/040
[52] U.S. Cl. ................. 250/208.1; 358/482
[58] Field of Search ............... 250/208.1, 234, 250/235, 214 R, 214 A, 214 AG, 214 C; 358/443, 446, 465, 471, 474, 475, 482, 483, 484, 494, 495, 496, 497

[56] References Cited

U.S. PATENT DOCUMENTS

| 4,680,644 | 7/1987 | Shirato et al. | 250/214 C |
| 4,723,174 | 2/1988 | Nishikawa et al. | 358/446 |
| 4,896,222 | 1/1990 | Fukai | 358/446 |
| 5,212,376 | 5/1993 | Liang | 250/208.1 |
| 5,822,052 | 10/1998 | Tsai | 250/208.1 |
| 5,859,421 | 1/1999 | Onishi et al. | 250/208.1 |

*Primary Examiner*—John R Lee
*Attorney, Agent, or Firm*—Merchant & Gould P.C.

[57] ABSTRACT

An image sensor is provided for reading images on an image carrying paper irradiated by light emitted from a light source. The image sensor includes a plurality of image sensor chips for receiving reflected light from the image carrying paper for output of image signals in accordance with the luminous energy of the reflected light. The image sensor also includes a light detector for receiving light directly from the light source for output of a detection signal in accordance with the luminous energy of the directly received light.

18 Claims, 12 Drawing Sheets

IMAGE SENSOR AND IMAGE READING APPARATUS

BACKGROUND OF THE INVENTION

1. Field of the Invention

The present invention relates to an image sensor for reading images printed on an image carrying paper. The present invention also relates to a contact type image reading apparatus using such an image sensor.

2. Description of the Related Art

Typically, in a conventional contact type image reading apparatus, light emitting diodes are used for the light source of the apparatus. One of the reasons for this is that the luminous energy of a light emitting diode is easily controlled. Another is that a light emitting diode has fast response to the control.

However, the luminous energy of a light emitting diode is rather small. Thus, for the conventional image reading apparatus using the light emitting diodes for its light source, it is impossible to perform a faster reading operation than is conventionally possible.

If the reading operation cannot be performed fast enough, the following inconvenience may occur. Recently, portable image readers have been widely utilized which can be held by the user and moved over an image carrying paper for scanning the images printed on the paper. If the reading speed of such a portable image reader is slow, the user has to hold the apparatus over the paper for an uncomfortably long time.

To overcome the above inconvenience, a cold-cathode tube may be used for a light source instead of light emitting diodes. As is well known in the art, a cold-cathode tube generates much greater luminous energy than a light emitting diode.

However, upon actuation, the temperature of a cold-cathode tube will rise by about 10–20° C. due to heat loss caused by discharge current. Thus, as shown in FIG. 13, it takes about 3–5 minutes for the cold-cathode tube to reach thermal equilibrium after the starting-up. This means that the user has to wait for about 3–5 minutes until the luminous energy of the tube becomes stable, which is disadvantageous.

Further, the temperature of the cold-cathode tube in thermal equilibrium is affected by the temperature of the surroundings. This means that the luminous energy of light emitted by the cold-cathode tube is different when the temperature of the surroundings is different. For instance, as shown in FIG. 13, the output of the cold-cathode tube in thermal equilibrium at a temperature of 0° C. is much smaller than the output at a temperature of 25 or 60° C. In this way, even after the cold-cathode tube reaches its thermal equilibrium state, the output of the tube may be disadvantageously changed as the temperature of the surroundings changes.

To cope with the above problem, attempts have been made to control an inverter used for driving the cold-cathode tube. However, it has been found that this method does not work well for controlling the luminous energy of the cold-cathode tube. Thus, conventionally, it is impossible to perform a high-speed and accurate reading operation with a contact type image reading apparatus using a cold-cathode tube for its light source.

SUMMARY OF THE INVENTION

It is, therefore, an object of the present invention to provide an image sensor and an image reading apparatus which are capable of overcoming the problems described above.

According to a first aspect of the present invention, there is provided an image sensor for reading images on an image carrying member irradiated by light emitted from a light source. The image sensor includes: a plurality of image sensor chips for receiving reflected light from the image carrying member for output of image signals in accordance with luminous energy of the reflected light; and light detecting means for receiving light directly from the light source for output of a detection signal in accordance with luminous energy of the directly received light.

With such an arrangement, it is possible to control the level of the image signals supplied from the image sensor chip on the basis of the detection signal from the light detecting means. In this way, the image signals of a predetermined constant level is obtained, even if the luminous energy of the light source is varied due to the temperature of the surroundings or until the light source reaches a stable state.

A MOS-type image sensor chip may be used for an image sensor chip. A photodiode, phototransistor or CdS cell may be used for the light detecting means. However, these are not limitative.

The image sensor chip may include a plurality of light receiving elements each having predetermined temperature characteristics. The light detecting means may include a phototransistor having temperature characteristics which are generally similar to those of the light receiving element.

With such an arrangement, even if the temperature characteristics of the light detecting means and light receiving elements vary as the temperature of the surroundings changes, the variations of their temperature characteristics are advantageously cancelled out.

According to a preferred embodiment of the present invention, the image sensor may further include amplifying means for amplifying the image signals from the image sensor chips. The amplifying means may have a variable amplification factor. The image sensor may also include amplification controlling means for varying the amplification factor of the amplifying means on the basis of the detection signal from the light detecting means.

The image sensor may further include memorizing means for storing correction data which include reference image signals from the image sensor chips and a reference detection signal from the light detecting means. Here, the reference image signals and reference detection signal are obtained by a test reading operation. In this embodiment, the amplification controlling means adjusts the amplification factor of the amplifying means for an actual reading operation on the basis of a detection signal from the light detecting means and the correction data stored in the memory. Thus, advantageously, the amplifying means provides amplified image signals having predetermined levels.

The memorizing means may comprise an EEPROM or flash memory for example.

The image sensor may further include amplification fixing means for forcing the amplification factor of the amplifying means to be set at a predetermined value.

The amplifying means, the light detecting means and the amplification controlling means may be incorporated in a single control chip.

According to another embodiment, the image sensor chip may supply red-, green- and blue-image signals. In this embodiment, the amplifying means may include a first amplifier, a second amplifier and a third amplifier which correspond to the red-, green- and blue-image signals, respectively. The amplification controlling means may be arranged to separately adjust amplification factors of the first to the third amplifiers.

With such an arrangement, it is possible to control the amplification factors for the red-, green- and blue-image signals independently of each other.

According to another embodiment, the light detecting means and the amplification controlling means may be integrally provided by CdS cells. Each CdS cell may have a resistance which varies in proportion to luminosity of the light source.

The amplifying means may include operational amplifiers each having an output terminal and an inverting terminal. In this case, each of the CdS cells is arranged between the output terminal and inverting terminal of a respective one of the operational amplifiers. The CdS cells may correspond to red-, green- and blue-image signals, respectively.

According to another embodiment, the amplification controlling means may include a negative feedback amplifier including a feedback circuit in which the light detecting means is arranged.

With such an arrangement, a variation of the luminous energy of the light source is advantageously cancelled out by a variation of the amplification factor of the amplifying means.

The amplification factor of the amplifying means may vary in accordance with a control voltage supplied by the negative feedback amplifier. The light detecting means may have a resistance which becomes smaller as the light detecting means receives greater luminous energy. In this way, it is possible to arrange that the feedback ratio of the feedback circuit becomes greater as the light detecting means receives greater luminous energy. Further, the negative feedback amplifier may have an amplification factor which becomes smaller as the feedback ratio becomes greater, so that the control voltage reduces.

The negative feedback amplifier may include an operational amplifier. Further, the feedback circuit may include a resistor connected in series to the light detecting means. In this case, the feedback circuit may be arranged between the output terminal and the inverting terminal of the operational amplifier.

According to another preferred embodiment, the image sensor chip supplies red-, green- and blue-image signals, and the amplifying means may include a first amplifier, a second amplifier and a third amplifier which correspond to the red-, green- and blue-image signals, respectively. Further, the light detecting means and the amplification controlling means may be provided in common for the red-, green- and blue-image signals.

According to a second aspect of the present invention, there is provided an image reading apparatus including: a light source for emitting light to irradiate images on an image carrying member; a plurality of image sensor chips for receiving reflected light from the image carrying member for output of image signals in accordance with luminous energy of the reflected light; light detecting means for receiving light directly from the light source for output of a detection signal in accordance with luminous energy of the directly received light; amplifying means for amplifying the image signals from the image sensor chips, the amplifying means being variable in amplification factor; and amplification controlling means for varying the amplification factor of the amplifying means on the basis of the detection signal from the light detecting means.

The light source may comprise a cold-cathode tube, though this is not limitative.

The the light detecting means, the amplifying means and the amplification controlling means may be incorporated in a single control chip so that space is saved. The image reading apparatus may further include a printed circuit board for carrying the control chip and the image sensor chips.

The image reading apparatus may include a housing for supporting the light source and the printed circuit board. The housing may be formed with a through-hole for leading the light emitted from the light source to the control chip.

Other objects, features and advantages of the present invention will be fully understood from the following detailed description given with reference to the accompanying drawings.

DETAILED DESCRIPTION OF THE PREFERRED EMBODIMENTS

The preferred embodiments of the present invention will be described below with reference to the accompanying drawings.

Figure 1:
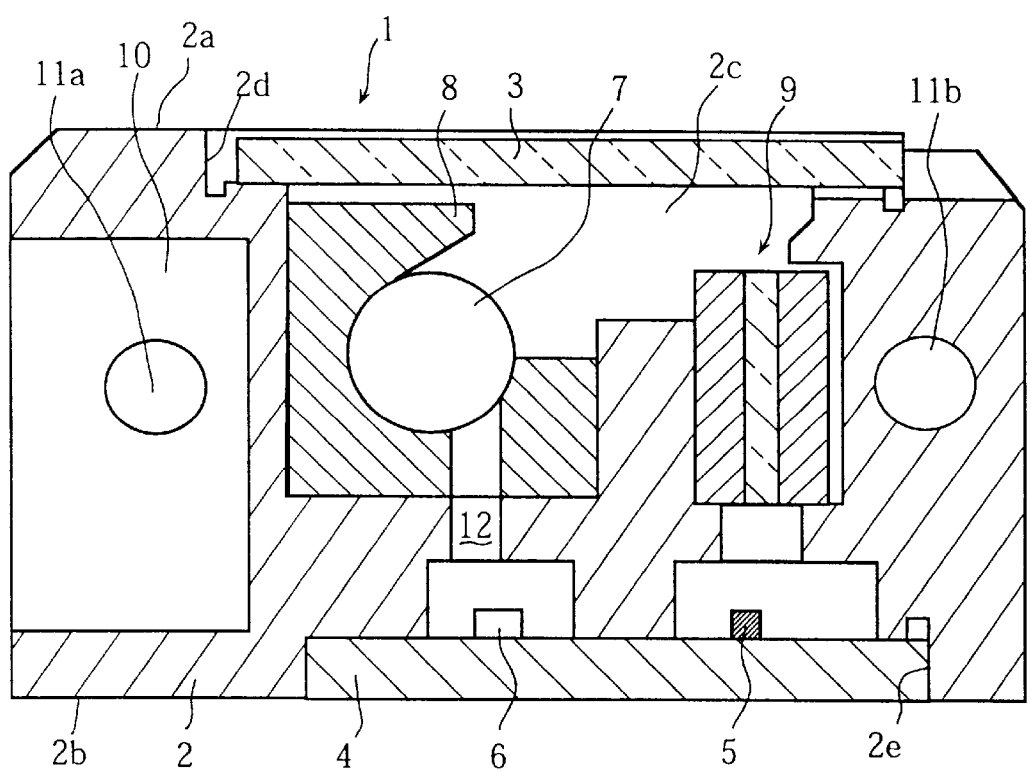
FIG. 1 sectional view showing a contact type image reading apparatus according to an embodiment of the present invention.

Reference is first made to FIG. 1 which is a cross-sectional view of a contact type image reading apparatus according to the present invention. The image reading apparatus 1 includes an elongated housing 2 having a predetermined length and a generally rectangular cross-section as shown in the figure. The housing 2 may be made of a synthetic resin for example. The housing 2 includes an obverse surface 2a and a bottom surface 2b. The housing 2 also includes a hollow space 2c extending vertically between the obverse surface 2a and the bottom surface 2b. The obverse surface 2a is formed with an upper opening 2d communicating with the hollow space 2c, while the bottom surface 2b is formed with a lower opening 2e which also communicates with the hollow space 2c. An elongated glass cover 3 is supported by the housing 2 for closing the upper opening 2d, while an elongated head substrate 4 is supported for closing the lower opening 2e.

The head substrate 4 has an upper surface provided with a plurality of image sensor chips 5 and a single control chip 6. The combination of the image sensor chips 5 and control chip 6 is referred to as "image sensor" here. The control chip 6 is used for processing image signals transmitted from the image sensor chips 5. As shown in the figure, the image sensor chips 5 are arranged closer to one of the longitudinal edges of the substrate 4, whereas the control chip 6 is arranged closer to the opposite longitudinal edge of the substrate 4.

In the hollow space 2c, the housing 2 carries a cold-cathode tube 7 as a white light source, a reflector 8 and an array of rod lenses 9. The reflector 8 is utilized for reflecting the light emitted from the cold-cathode tube 7 so that an image carrying paper on the glass cover 3 is properly illuminated. The rod lenses 9 are used for causing the light reflected by the image carrying paper to converge on the image sensor chips 5. With the use of the rod lenses, the original images of the image carrying paper are projected onto the image sensor chips 5 without undergoing any change in orientation and size.

The housing 2 carries an inverter substrate 10 formed with an inverter circuit for driving the cold-cathode tube 7. Further, the housing 2 is formed with a pair of circular fixing holes 11a and 11b extending longitudinally of the housing 2. A through-hole 12 is made in the housing 2 and the reflector 8 so that part of the light emitted from the cold-cathode tube 7 is projected onto the control chip 6.

Figure 2:
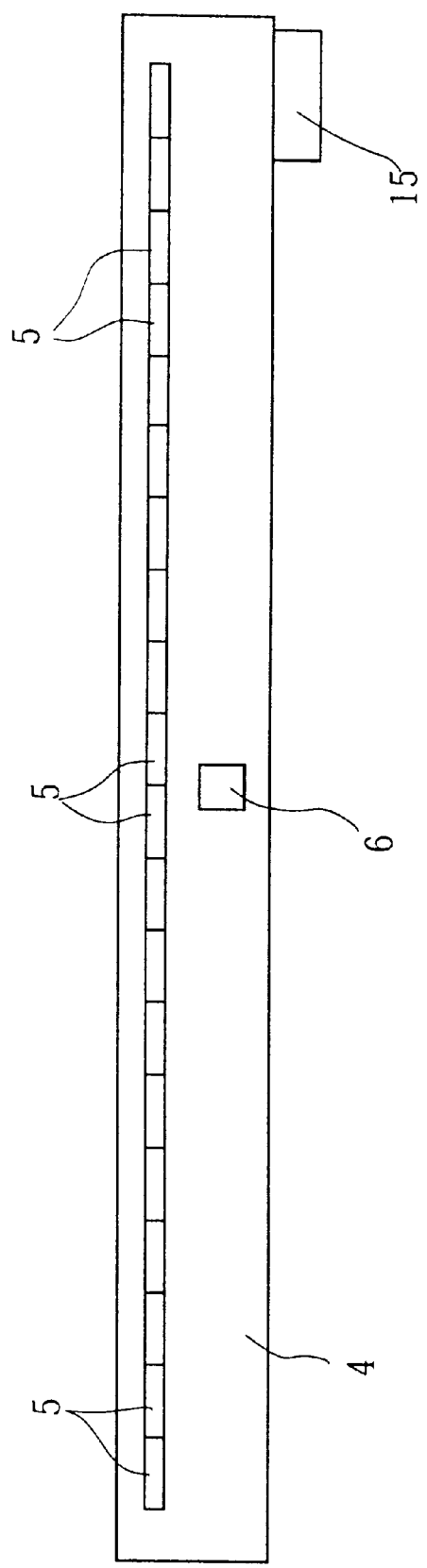
FIG. 2 is a plan view showing a head substrate used for the image reading apparatus.

FIG. 2 is a plan view showing the head substrate 4. In the illustrated embodiment, the head substrate 4 carries twenty (20) image sensor chips 5 arranged longitudinally of the substrate 4. However, the number of the image sensor chips 5 is not limitative.

The control chip 6 is arranged at a longitudinally central portion of the head substrate. A connector 15 is attached to an end portion of the head substrate 4.

Figure 3:
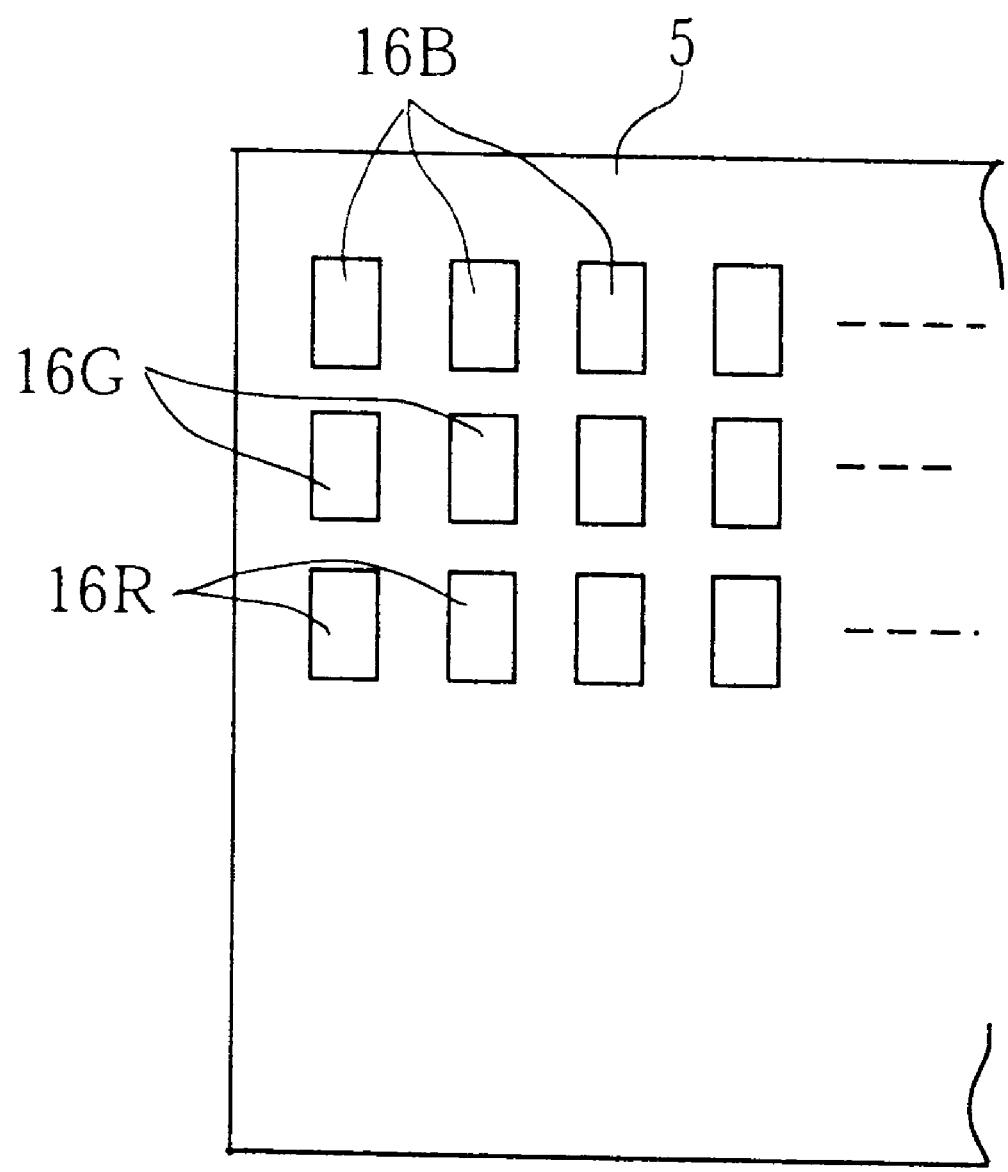
FIG. 3 is a plan view showing part of an image sensor chip mounted on the head substrate.

FIG. 3 illustrates an arrangement of light receiving elements 16 of each image sensor chip 5. The light receiving elements 16 are divided into three arrays each of which extends longitudinally of the chip 5 (or horizontally in the figure). The first array (which is closest to the upper longitudinal edge of the chip 5) consists of light receiving elements 16B for detection of light beams corresponding to blue (hereinafter called "blue beams"). The second array consists of light receiving elements 16G for detection of light beams corresponding to green (hereinafter called "green beams"), while the third array consists of light receiving elements 16R for detection of light beams corresponding to red (hereinafter called "red beams"). Each array may include, for example, one hundred and twenty eight (128) light receiving elements equally spaced from each other. The light receiving elements 16B, 16G and 16R include blue-colored, green-colored and red-colored resist layers, respectively.

Figure 4:
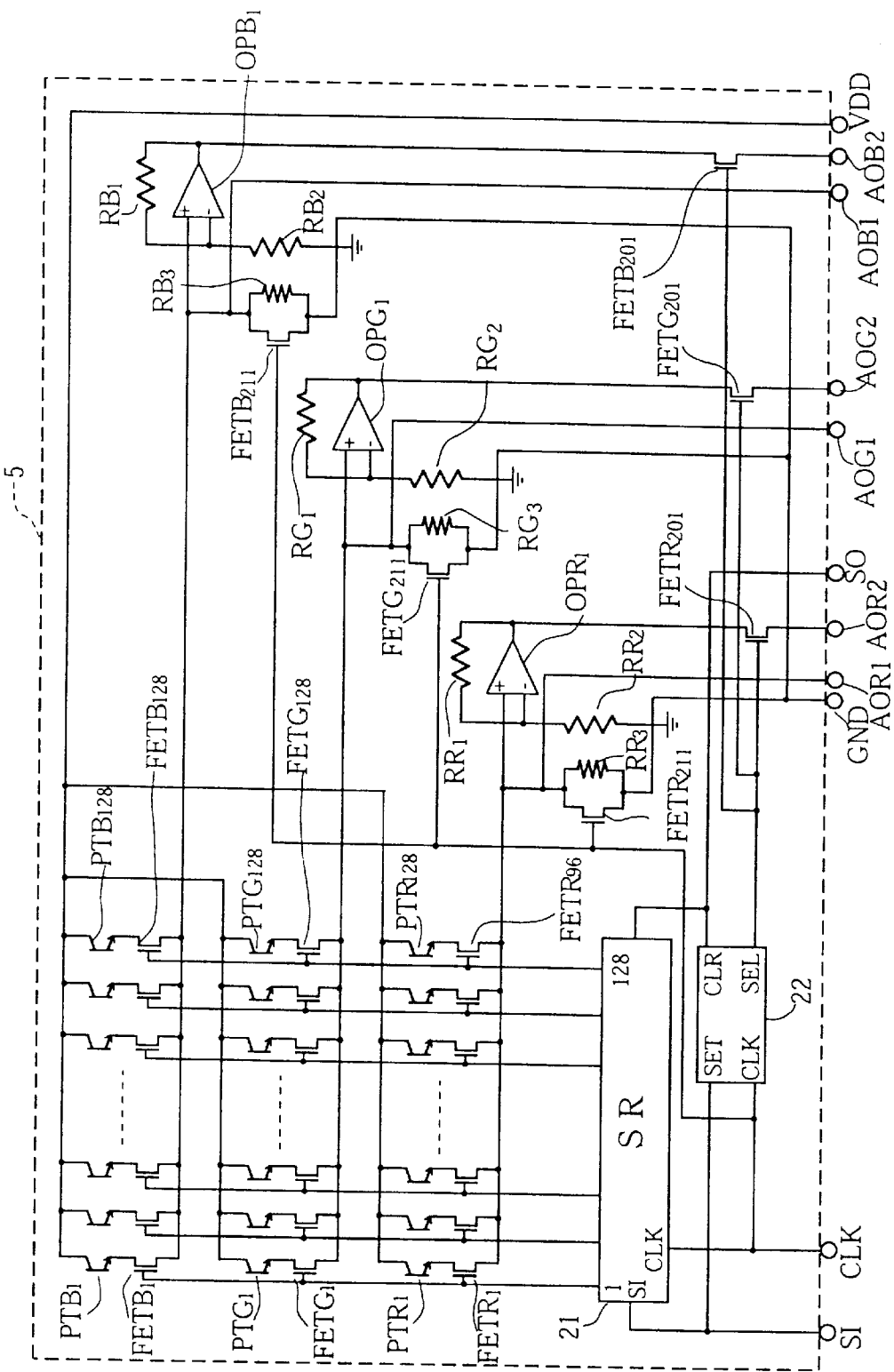
FIG. 4 is a circuit block diagram of the image sensor chip.

FIG. 4 is a circuit block diagram of the image sensor chip 5. The image sensor chip 5 includes a 128-bit shift register 21, a chip selection circuit 22, one hundred and twenty eight (128) phototransistors $PTR_1$–$PTR_{128}$ for detection of red beams, one hundred and twenty eight (128) phototransistors $PTG_1$–$PTG_{128}$ for detection of green beams, one hundred and twenty eight (128) phototransistors $PTB_1$–$PTB_{128}$ for detection of blue beams. The chip 5 also includes one hundred and twenty eight (128) of first field-effect transistors $FETR_1$–$FETR_{128}$ for red beams, one hundred and twenty eight (128) of first field-effect transistors $FETG_1$–$FETG_{128}$ for green beams, one hundred and twenty eight (128) of first field-effect transistors $FETB_1$–$FETB_{128}$ for blue beams, a second field-effect transistor $FETR_{201}$ for red beams, a second field-effect transistor $FETG_{201}$ for green beams, a second field-effect transistor $FETB_{201}$ for blue beams, a third field-effect transistor $FETR_{211}$ for red beams, a third field-effect transistor $FETG_{211}$ for green beams, and a third field-effect transistor $FETB_{211}$ for blue beams.

The chip 5 further includes an operational amplifier $OPR_1$ for red beams, an operational amplifier $OPG_1$ for green beams, an operational amplifier $OPG_1$ for blue beams, three resistors $RR_1$–$RR_3$ for red beams, three resistors $RG_1$–$RG_3$ for green beams, three resistors $RB_1$–$RB_3$ for blue beams, and eleven (11) pads (SI, CLK, GND, AOR1, AOR2, SO, AOG1, AOG2, AOB1, AOB2, VDD). All of the above first field-effect transistors ($FETR_1$–$FETR_{128}$, $FETG_1$–$FETG_{128}$, $FETB_1$–$FETB_{128}$), the second field-effect transistors ($FETR_{201}$, $FETG_{201}$, $FETB_{201}$) and the third field-effect transistors ($FETR_{211}$, $FETG_{211}$, $FETB_{211}$) are MOS transistors.

The pad SI receives a serial-in signal, while the pad CLK receives a clock signal having a frequency of 8 MHz for example. The clock signal is transmitted to the pad CLK from outside the image reading apparatus 1 via the connector 15. The pad GND is connected to a grounding conductor.

Analog image signals corresponding to red beams (hereinafter called "red-image signals") are serially output at both of the pad AOR1 and the pad AOR2. Here, the red-image signals at the pad AOR1 differ from those at the pad AOR2 in that the former are not amplified, whereas the latter are amplified. Similarly, image signals corresponding to green beams (hereinafter called "green-image signals") are serially output at both of the pad AOG1 and the pad AOG2. The green-image signals at the pad AOG1 are not amplified, whereas the green-image signals at the pad AOG2 are amplified. Further, image signals corresponding to blue beams (hereinafter called "blue-image signals") are serially output at both of the pad AOB1 and the pad AOB2. The blue-image signals at the pad AOB1 are not amplified, whereas the blue-image signals at the pad AOB2 are amplified.

A serial-out signal is output at the pad SO. A power source voltage (5V for example), which is transmitted from outside the image reading apparatus 1 via the connector 15, is supplied to the pad VDD. The phototransistors $PTR_1$–$PTR_{128}$ receive light beams which have passed through the light receiving elements 16R. Similarly, the phototransistors $PTG_1$–$PTG_{128}$ receive light beams which have passed through the light receiving elements 16G. The phototransistors $PTB_1$–$PTB_{128}$ receive light beams which have passed through the light receiving elements 16B.

Figure 5:
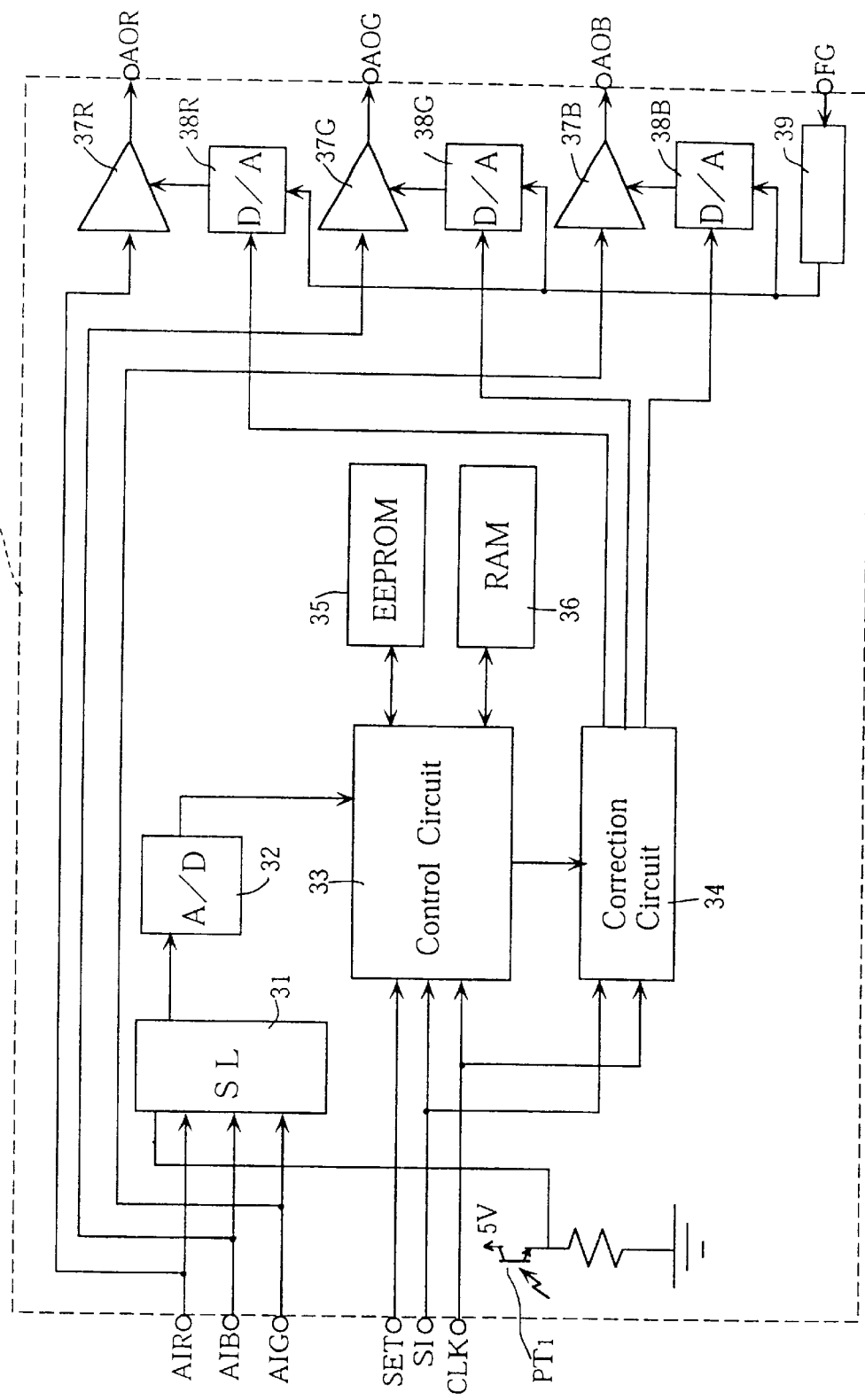
FIG. 5 is a circuit block diagram of a control chip mounted on the head substrate.

FIG. 5 is a circuit block diagram showing the control chip 6. The control chip 6 includes a selector 31, an A/D converter 32, a control circuit 33, a correction circuit 34, an EEPROM 35, a RAM 36, an amplifier 37R for red-image signals, an amplifier 37G for green-image signals, an amplifier 37B for blue-image signals, a D/A converter 38R for red-image signals, a D/A converter 38G for green-image signals, a D/A converter 38B for blue-image signals, a gain-fixing circuit 39, a phototransistor $PT_1$, and ten (10) pads (AIR, AIB, AIG, SET, SI, CLK, AOR, AOG, AOB, FG).

The pad AIR receives the red-image signals which are supplied from the pad AOR2 of the image sensor chip 5. The pad AIG receives the green-image signals which are supplied from the pad AOG2 of the image sensor chip 5. The pad AIB receives the blue-image signals which are supplied from the pad AOB2 of the image sensor chip 5. The pad SET receives setting signals which are transmitted from outside the image reading apparatus 1 via the connector 15. The pad SI receives serial-in signals transmitted from outside the image reading apparatus 1 via the connector 15. The pad CLK receives clock signals transmitted from outside the image reading apparatus 1 via the connector 15. The pad FG receives amplification-fixing signals transmitted from outside the image reading apparatus 1 via the connector 15.

The amplification-fixing signals cause the amplification factors of the respective amplifiers 37R, 37G, 37B to be fixed at 1 for example. The pad AOR supplies red-image signals which are amplified by the amplifier 37R. These amplified red-image signals are transmitted outward of the image reading apparatus 1 via the connector 15. Similarly, The pad AOG outputs green-image signals which are amplified by the amplifier 37G, and these amplified green-image signals are transmitted outward of the image reading apparatus 1 via the connector 15. The pad AOB outputs blue-image signals which are amplified by the amplifier 37B, and these amplified blue-image signals are transmitted outward of the image reading apparatus 1 via the connector 15.

The operation of the selector 31 is controlled by the control circuit 33. As a result, the analog image signals supplied to the pads AIR, AIG and AIB are selectively transmitted to the A/D converter 32 in a successive manner for example. Further, the selector 31 transmits an analog detection signal produced by the phototransistor $PT_1$ to the A/D converter 32. The A/D converter 32 converts the image signals and the detection signal coming from the selector 31 into digital signals.

Thereafter, these digital signals are transmitted to the control circuit 33. The control circuit 33, when receiving the setting signal via the pad SET, provides correction data on the basis of the digital signals supplied from the A/D converter 32. The correction data are used as reference data for setting the amplification factors of the respective amplifiers 37R, 37G and 37B. The correction data are stored in the EEPROM 35.

The detection signal, which is produced by the phototransistor $PT_1$ and then converted into a digital signal by the A/D converter 32, is supplied to the correction circuit 34 by the control circuit 33. The control circuit 33 reads out the correction data stored in the EEPROM 35 to supply it to the correction circuit 34. The correction circuit 34 determines the amplification factors of the respective amplifiers 37R, 37G, 37B on the basis of the detection signal and correction data supplied by the control circuit 33. In accordance with the determined amplification factors, the correction circuit 34 supplies digital amplification controlling signals to the D/A converters 38R, 38G and 38B. The EEPROM 35 stores the correction data calculated by the control circuit 33. Controlled by the control circuit 33, the RAM 36 serves as a working memory for calculating operation.

The amplifiers 37R, 37G, 37B amplify the analog image signals from the pads AIR, AIG and AIB according to the amplification factors corresponding to the amplification controlling signals or the amplification fixing signals supplied by the D/A converters 38R, 38G, 38B. The D/A converters 38R, 38G, 38B convert the digital amplification controlling signals supplied by the correction circuit 34 into analog signals. These analog signals are supplied to the amplifiers 37R, 37G, 37B.

When receiving the digital amplification fixing signals from the gain-fixing circuit 39, the D/A converters 38R, 38G and 38B convert the amplification fixing signals from the gain-fixing circuit 39 into analog signals, and then supply them to the amplifiers 37R, 37G and 37B, regardless of the presence of the amplification controlling signals supplied by the correction circuit 34. The phototransistor $PT_1$ has the same temperature characteristics as those of the phototransistors $PTR_1$–$PTR_{128}$, $PTG_1$–$PTG_{128}$ and $PTB_1$–$PTB_{128}$ of the image sensor chip 5. When irradiated by the light emitted from the cold-cathode tube 7, the phototransistor $PT_1$ produces an analog detection signal in accordance with the luminous energy of the light.

As described above, the cold-cathode tube 7 works as a light source for illuminating an image carrying paper. The image sensor chips 5 receive the light reflected on the image carrying paper for output of analog image signals (corresponding to the respective picture elements) in accordance with the luminous energy of the received light. The amplifiers 37R, 37G, 37B work as amplifying means for amplifying the image signals supplied by the image sensor chips 5. The amplification factor of each amplifier is variable.

The phototransistor $PT_1$ works as light detecting means which receives light directly from the light source for output of detection signals in accordance with the luminous energy of the directly received light. The control circuit 33, the correction circuit 34 and the D/A converters 38R, 38G, 38B work as amplification controlling means for varying the amplification factor of the amplifying means on the basis of the detection signals supplied by the light detecting means.

The EEPROM 35 works as memorizing means for storing the correction data. The gain-fixing circuit 39 works as amplification-fixing means for setting the amplification factors of the respective amplifiers at predetermined values. The control chip 6 incorporates the above-mentioned amplifying means, light detecting means and amplification controlling means. The head substrate 4 works as a printed circuit board carrying the control chip 6 and the image sensor chips 5. The housing 2 supports the head substrate 4 and the light source 7.

Description will now be made to the operation of the image reading apparatus 1. Before the head substrate 4 carrying the image sensor chips 5 is attached to the housing 2, the image sensor chips 5 are subjected to an inspection procedure which is performed as follows.

First, an amplification-fixing signal is supplied to the pad FG of the control chip 6. This causes the gain-fixing circuit 39 to supply digital amplification-fixing signals to the D/A converters 38R, 38G, 38B for setting each of the amplification factors of the amplifiers 37R, 37G, 37B at 1 for example. Then, the D/A converters 38R, 38G, 38B convert the above amplification-fixing signals into analog signals which are supplied to the amplifiers 37R, 37G and 37B. As a result, the amplification factors of the amplifiers 37R, 37G, 37B are fixed at 1. In this state, the image sensor chips 5 are irradiated by light having known luminous energy. By measuring the levels of the image signals obtained at the pads AOR, AOG and AOB, it can be known whether or not the image sensor chips 5 function properly.

When the function of each image sensor chip 5 is found normal by the above inspection, the head substrate 4 is attached to the housing 2. After the image reading apparatus chip 1 is assembled, correction data are stored in the EEPROM 35 in a test reading procedure as follows.

First, the cold-cathode tube 7 is turned on to illuminate e.g., a white paper sheet (whose brightness is known) placed on the glass cover 3 of the image reading apparatus 1. In this condition, a clock signal is supplied to the pad CLK of the image sensor chip 5 and to the pad CLK of the control chip 6, while a serial-in signal is supplied to the pad SI of the first image sensor chip 5 (the one arranged at the left end of the chip array shown in FIG. 2.) and to the pad SI of the control chip 6. Further, a setting signal is supplied to the pad SET of the control chip 6. As a result, red-, green- and blue-image signals are simultaneously output in a serial manner from the pads AOR2, AOG2 and AOB2 of the image sensor chip 5 in synchronism with the clock signal. These analog signals are supplied to the input terminals of the selector 31 via the pads AIR, AIG and AIB of the control chip 6.

On the other hand, the phototransistor $PT_1$ produces an analog detection signal in accordance with the luminous energy of light coming directly from the cold-cathode tube 7. The detection signal is supplied to an input terminal of the selector 31.

Then, the selector 31 selectively supplies the red-, green- and blue-image signals in a successive manner to an input terminal of the A/D converter 32. At this time, the selector 31 receives a clock signal as a timing signal from the control circuit 33. After selected by the selector 31, the above signals (i.e., the detection signal, the red-image signal, the green-image signal, and the blue-image signal) are supplied to the A/D converter 32 to be converted into digital signals which are fed to the control circuit 33.

After the reading operation for one line is finished, the selector 31 transmitts the detection signal produced by the phototransistor $PT_1$ to the A/D converter 32. The A/D converter 32 converts the detection signal into a digital signal which is fed to the control circuit 33. Thereafter, the control circuit 33 determines the highest-level signals among the image signals for the respective colors. Then, the highest-level signals and the detection signal are stored in the RAM 36.

More specifically, the above determination may be performed as follows. Taking the red-image signals for example, first, the red-image signal corresponding to the first picture element is stored in the RAM 36. Then, the image signal corresponding to the next or second picture element is compared to the image signal corresponding to the first picture element. If the image signal corresponding to the second picture element is greater than that corresponding to the first picture element, the image signal corresponding to the second picture element is stored in the RAM 36 in place of the image signal corresponding to the first picture element. If otherwise, the image signal corresponding to the first picture element remains in the RAM 36. Thereafter, the above operation is repeated for the other picture elements. As a result, the highest-level image signal among the red-image signals is stored in the RAM 36. As is easily understood, the highest-level image signals for the other colors are stored in the RAM 36 in the same manner.

Based on the resulting highest-level image signals for three colors and the detection signal, the amplification factors of the amplifiers 37R, 37G, 37B are adjusted so that the maximum values of the amplified image signals supplied by the respective amplifiers are equal to predetermined values. The products of the adjusted amplification factors and the detection signal are stored in the EEPROM 35.

The reading operation for one line takes only a very short time. Therefore it can be assumed that the luminous energy of the light emitted by the cold-cathode tube 7 is substantially constant during the reading operation. Thus, in the preferred embodiment, the detection signal produced by the phototransistor $PT_1$ is supplied to the control circuit 33 only at the end of the reading operation for every line. However, the detection signal may be supplied to the control circuit 33 at the start of the reading operation for every line. Further, the detection signal may be supplied to the control circuit 33 every time image signals corresponding to the respective picture elements are supplied to the control circuit 33.

Description will now be made to an actual reading operation for an image carrying paper. While the cold-cathode tube 7 is turned on, a clock signal is supplied to the pads CLK of the respective image sensor chips 5 and to the pad CLK of the control chip 6. The clock signal may be supplied from outside the contact type image reading apparatus 1 via the connector 15. The clock signal may have a frequency of 8 MHz for example. Further, a serial-in signal is supplied to the pad SI of the first image sensor chip 5 of the twenty image sensor chips and to the pad SI of the control chip 6.

The serial-in signal supplied to the pad SI of the first image sensor chip 5 is transmitted to the SET terminal of the chip selection circuit 22. Then, the chip selection circuit 22 causes the selection signal supplied from the selection signal output terminal to have a high-level value in synchronism with the clock signal CLK. The selection signal, which has a reversed signal of the clock signal CLK, is transmitted to the gates of the second field-effect transistors $FETR_{201}$, $FETG_{201}$ and $FETB_{201}$. Thus, when the clock signal has a low-level value, the second field-effect transistors $FETR_{201}$, $FETG_{201}$ and $FETB_{201}$ are turned on.

The serial-in signal SI is also supplied to the input terminal of the shift register 21. The serial-in signal is taken into the first bit of the shift register 21 at the timing of the falling of the clock signal. As a result, the first bit of the shift register 21 is turned on and the high-level signal is supplied to the gates of the first field-effect transistors $FETR_1$, $FETG_1$ and $FETB_1$. Thus, the first field-effect transistors $FETR_1$, $FETG_1$ and $FETB_1$ are turned on. At this time, since the clock signal has a low-level value, the third field-effect transistors $FETR_{211}$, $FETG_{211}$ and $FETB_{211}$ are turned off.

In the above condition, electric currents due to the electrical charge stored at the phototransistors $PTR_1$, $PTG_1$, and $PTB_1$ are transmitted via the first field-effect transistors $FETR_1$, $FETG_1$ and $FETB_1$ to the resistors $RR_3$, $RG_3$ and $RB_3$. Then, the voltages across the resistors $RR_3$, $RG_3$ and $RB_3$ are supplied to the noninverting terminals of the operational amplifiers $OPR_1$, $OPG_1$ and $OPB_1$, respectively. The above voltages are amplified by amplification factors specified by the ratios of the resistances of the resistors $RR_1$, $RG_1$ and $RB_1$ to the resistances of the resistors $RR_2$, $RG_2$ and $RB_2$. Thus amplified voltages are outputted as analog image signals from the pad AOR2, the pad AOG2 and the pad AOB2, respectively. At this time, the clock signal has a low-level value, while the selection signal has a high-level value. Thus, the second field-effect transistors $FETR_{201}$, $FETG_{201}$ and $FETB_{201}$ are turned on. Analog image signals which are not amplified by the amplifiers $OPR_1$, $OPG_1$ and $OPB_1$ are outputted from the pads AOR1, AOG1 and AOB1.

When the clock signal rises from the low-level to the high-level, the selection signal falls to the low-level. As a result, the second field-effect transistors $FETR_{201}$, $FETG_{201}$ and $FETB_{201}$ are turned off, thereby stopping the output of the image signals from the pads AOR2, AOG2 and AOB2, while the third field-effect transistors $FETR_{211}$, $FETG_{211}$ and $FETB_{211}$ are turned on, thereby discharging the residual charges at the phototransistors $PTR_1$, $PTG_1$ and $PTB_1$ via the third field-effect transistors $FETR_{211}$, $FETG_{211}$ and $FETB_{211}$.

When the clock signal falls from the high level to the low level, the serial-in signal SI is shifted from the first bit to the second bit of the shift register 21. Here again, analog image signals corresponding to the charges stored in the phototransistors $PTR_1$, $PTG_1$ and $PTB_1$ are outputted from the pads AOR2, AOG2 and AOB2.

Thereafter, analog image signals corresponding to the charges stored in the phototransistors $PTR_3$–$PTR_{128}$, $PTG_3$–$PTG_{128}$ and $PTB_3$–$PTB_{128}$ are successively outputted from the pads AOR2, AOG2 and AOB2 in synchronism with the clock signal. Finally, the serial-in signal is outputted from the final bit of the shift register 21 at the timing of the falling of the clock signal. Then, the serial-in signal is transmitted to the clear signal terminal of the chip selection circuit 22 as a clear signal, and to the pad SO to be outputted as a serial-out signal. As a result, the chip selection circuit 22 keeps the selection signal at the low level.

The serial-out signal outputted from the pad SO is supplied as a serial-in signal to the pad SI of a second image sensor chip 5 adjacent to the first image sensor chip 5.

The second image sensor chip 5 operates in the same manner as the first image sensor chip 5. Thus, analog image signals corresponding to the electric charges stored in the phototransistors $PTR_1$–$PTR_{128}$, $PTG_1$–$PTG_{128}$ and $PTB_1$–$PTB_{128}$ are successively obtained from the pads AOR2, AOG2 and AOB2 of the second image sensor chip 5. As is easily understood, the other image sensor chips 5 (namely, third to twentieth image sensor chips 5) also operate in the same manner.

The image signals outputted from the pads AOR2, AOG2 and AOB2 of the twenty image sensor chips 5 are transmitted to the pads AIR, AIG and AIB of the control chip 6. This means that each of the pads AIR, AIG and AIB of the control chip 6 receives analog image signals corresponding to 2560 (128×20) picture elements.

When the serial-in signal is supplied to the pad SI of the control chip 6, the control circuit 33 supplies a clock signal to the selector 31. Then, the selector 31 supplies the analog detection signal produced by the phototransistor $PT_1$ to the A/D converter 32. In synchronism with the clock signal, the A/D converter 32 converts the detection signal into e.g. 8-bit digital signal which is transmitted to the control circuit 33. As a result, the control circuit 33 supplies the detection signal from the A/D converter and the correction data stored in the EEPROM 35 to the correction circuit 34. Based on the detection signal and correction data from the control circuit 33, the correction circuit 34 calculates suitable amplification factors for the amplifiers 37R, 37G and 37B. The calculated amplification factors, which are now digital amplification control signals, are supplied to the D/A converters 38R, 38G and 38B, respectively.

The image signals converted by the A/D converter 32 are 8-bit data. Thus, in order to ensure the accuracy of the image signals outputted from the amplifiers 37R, 37G and 37B, the amplification control signals should be at least 10-bit data, or preferably, 12-bit to 16-bit data. The digital amplification control signals are converted into analog amplification control signals by the respective D/A converters 38R, 38G and 38B. Then, the analog amplification control signals are supplied to the amplification control signal terminals of the respective amplifiers 37R, 37G and 37B. As a result, the amplifiers 37R, 37G and 37B amplify the image signals supplied to the pads AIR, AIG and AIB by amplification factors corresponding to the amplification control signals. The amplified signals are outputted from the pads AIR, AIG and AIB. Thus outputted image signals are transmitted outward from the image reading apparatus 1 via the connector 15.

The above-described operation for determining the amplification factors of the amplifiers 37R, 37G and 37B is completed while the first twelve pulses of the clock signal are being sent. Thereafter, the amplification factors of the amplifiers 37R, 37G and 37B are fixed during the image reading operation for each line. It is possible to perform the above amplification determining operation in such a way because the luminous energy of the cold-cathode tube 7 is regarded as substantially constant during the reading operation since the reading operation takes only very short time.

More specific description will now be made to the reason why the amplification factors of the amplifiers 37R, 37G and 37B are properly controlled by the process described above.

Here, the outputs of the amplifiers 37R, 37G and 37B are designated as $A_0$, the amplification factors of the amplifiers 37R, 37G and 37B as G, the luminosity of the cold-cathode tube 7 as L, and the sensitivity of the image sensor chip 5 as S. Then, the following equation holds.

$$A_0 = G \times L \times S \tag{1}$$

From this, the following equation is obtained.

$$G = A_0/(L \times S) \tag{2}$$

Here, it can be assumed that the sensitivity S is constant, while the output $A_0$ is a predetermined constant value.

When $A_0/S=K$ (which is constant), the equation (2) is reduced to $$G = K/L \tag{3}$$

Figure 6:
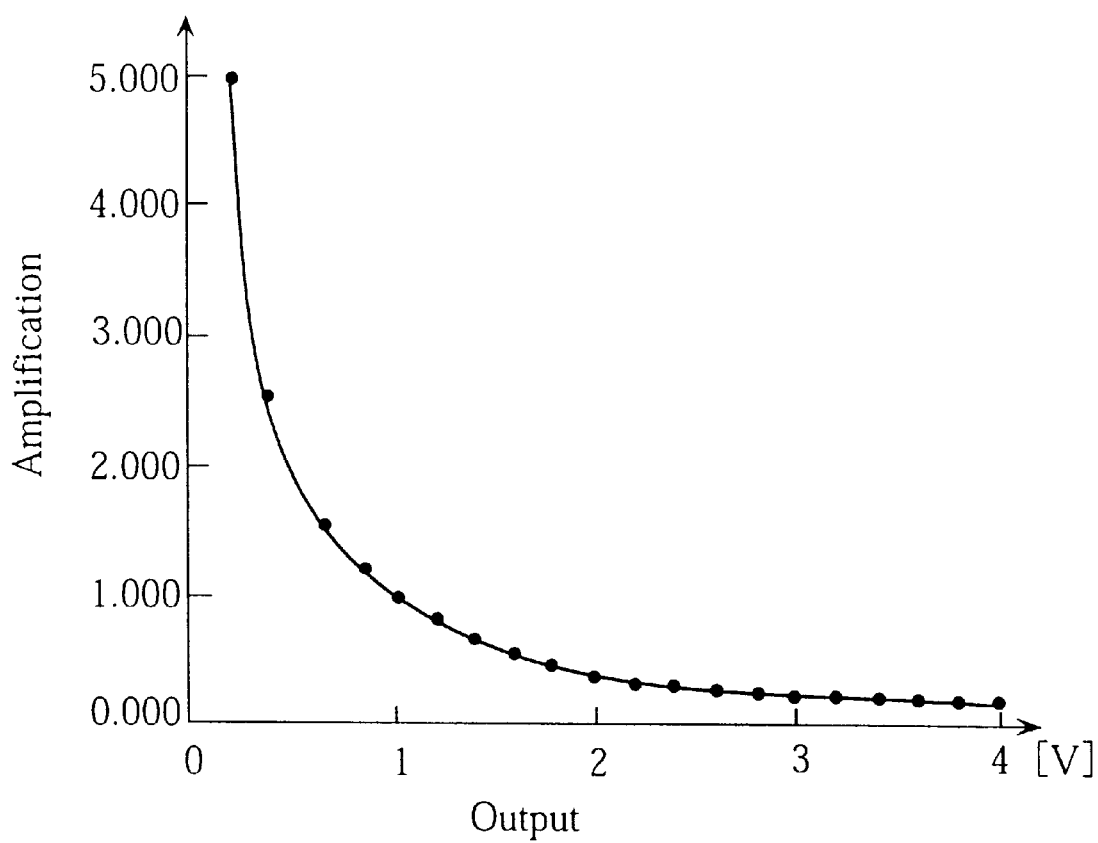
FIG. 6 is a graph illustrating the relationship between the output of a phototransistor and the amplification factor of an amplifier.

The equation (3) shows that the amplification factor G is inversely proportional to the luminosity L. Here, the luminosity L of the cold-cathode tube 7 is proportional to the output of the phototransistor $PT_1$ (i.e., to the detection signal). Thus, as shown in FIG. 6, the amplification factors of the amplifiers 37R, 37G and 37B are inversely proportional to the output of the phototransistor $PT_1$.

As is easily understood, the amplification factor G can be determined from the equation (3) in accordance with the luminosity L. In this way, even if the luminosity L of the cold-cathode tube 7 is varied, the amplification factor G is determined so that the output $A_0$ has a predetermined constant value.

Now, it is further assumed that the value of the detection signal from the phototransistor $PT_1$ is Li, and that the maximum values of the red-, green- and blue-image signals transmitted from the image sensor chips 5 are Sr, Sg and Sb. In such an instance, in order to cause the amplifiers 37R, 37G and 37B to output image signals whose maximum values are equal to the predetermined $A_0$, the amplification factors of the amplifiers 37R, 37G and 37B (which factors are designated as "Gir, Gig and Gib" below) are determined as follows.

$$Gir = A_0/Sr \tag{4a}$$

$$Gig = A_0/Sg \tag{4b}$$

$$Gib = A_0/Sb \tag{4c}$$

Then, it is assumed that the value of the detection signal is changed from Li to L at the time of an actual reading operation. In such an instance, the amplification factors of the respective amplifiers 37R, 37G and 37B are changed from Gir, Gig and Gib to Gr, Gg and Gb in accordance with the following equations. As a result, the amplifiers 37R, 37G and 37B will produce image signals whose maximum values are equal to the predetermined $A_0$.

$$Gr = Gir \times Li/L \quad (5a)$$

$$Gg = Gig \times Li/L \quad (5b)$$

$$Gb = Gib \times Li/L \quad (5c)$$

In the image reading apparatus 1 described above, at the time of determining the correction data, the control circuit 33 detects the values of Li, Sr, Sg and Sb, and calculates the above Gir, Gig and Gib by using the equations 4a–4c. Then, the products of the Gir, Gig, Gib and the Li are stored, as correction data, in the EEPROM 35. During the actual reading operation thereafter, the control circuit 33 reads out the values of Gir×Li, Gig×Li and Gib×Li from the EEPROM 35. These read-out values and the detection signal L from the phototransistor $PT_1$ are supplied to the correction circuit 34. Then, based on the values of Gir×Li, Gig×Li and Gib×Li and the value of L, the correction circuit 34 calculates the amplification factors Gr, Gg and Gb by using the equations 5a–5c. The calculated amplification factors are supplied, as e.g. 10-bit amplification control signals, to the D/A converters 38R, 38G and 38B, respectively.

According to the present invention, the amplification factors of the amplifiers 37R, 37G and 37B are controlled for each line in accordance with the luminous energy of the cold-cathode tube 7.

Therefore, it is possible to start the reading operation immediately after the turning-on of the cold-cathode tube 7, thereby eliminating an idling time (a few minutes for example) which would otherwise be taken until the luminous energy of the cold-cathode tube 7 becomes stable. Further, even when the luminous energy of the cold-cathode tube 7 is small due to low temperature of the atmosphere or surroundings, it is possible to perform the reading operation with high accuracy and at high speed.

In the embodiment described above, the control chip 6 is mounted on the head substrate 4. However, the control chip 6 may be mounted on an additional substrate separate from the head substrate 4. The additional substrate may be arranged within the image reading apparatus 1 or outside it.

Further, in the above embodiment, the light detecting means, amplifying means and amplification controlling means are provided by the control chip 6. However, the light detecting means and the amplification controlling means may be provided by CdS cells as follows.

Figure 7:
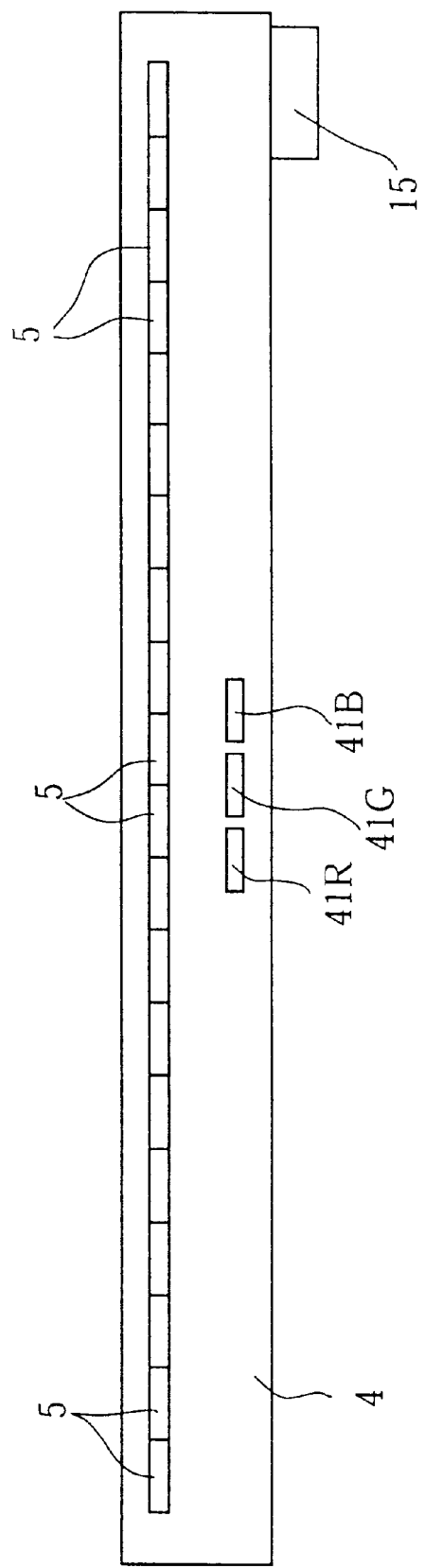
FIG. 7 is a plan view showing a head substrate according to another embodiment.
Figure 8:
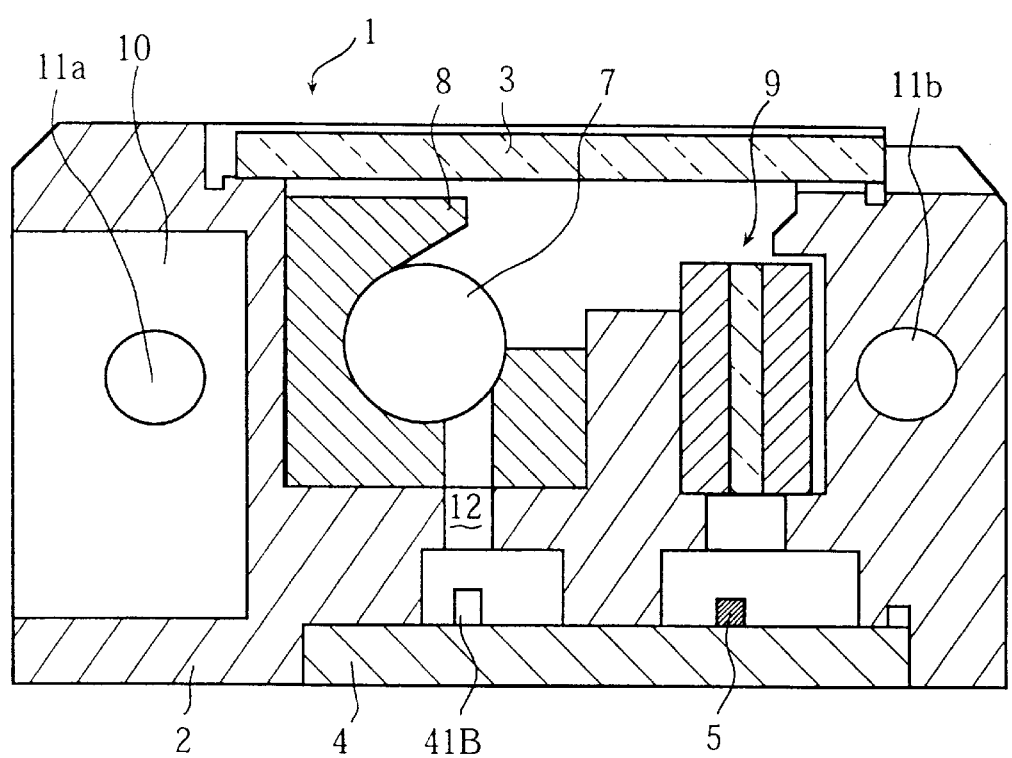
FIG. 8 is a sectional view showing an image reading apparatus provided with the head substrate shown in FIG. 7.
Figure 9:
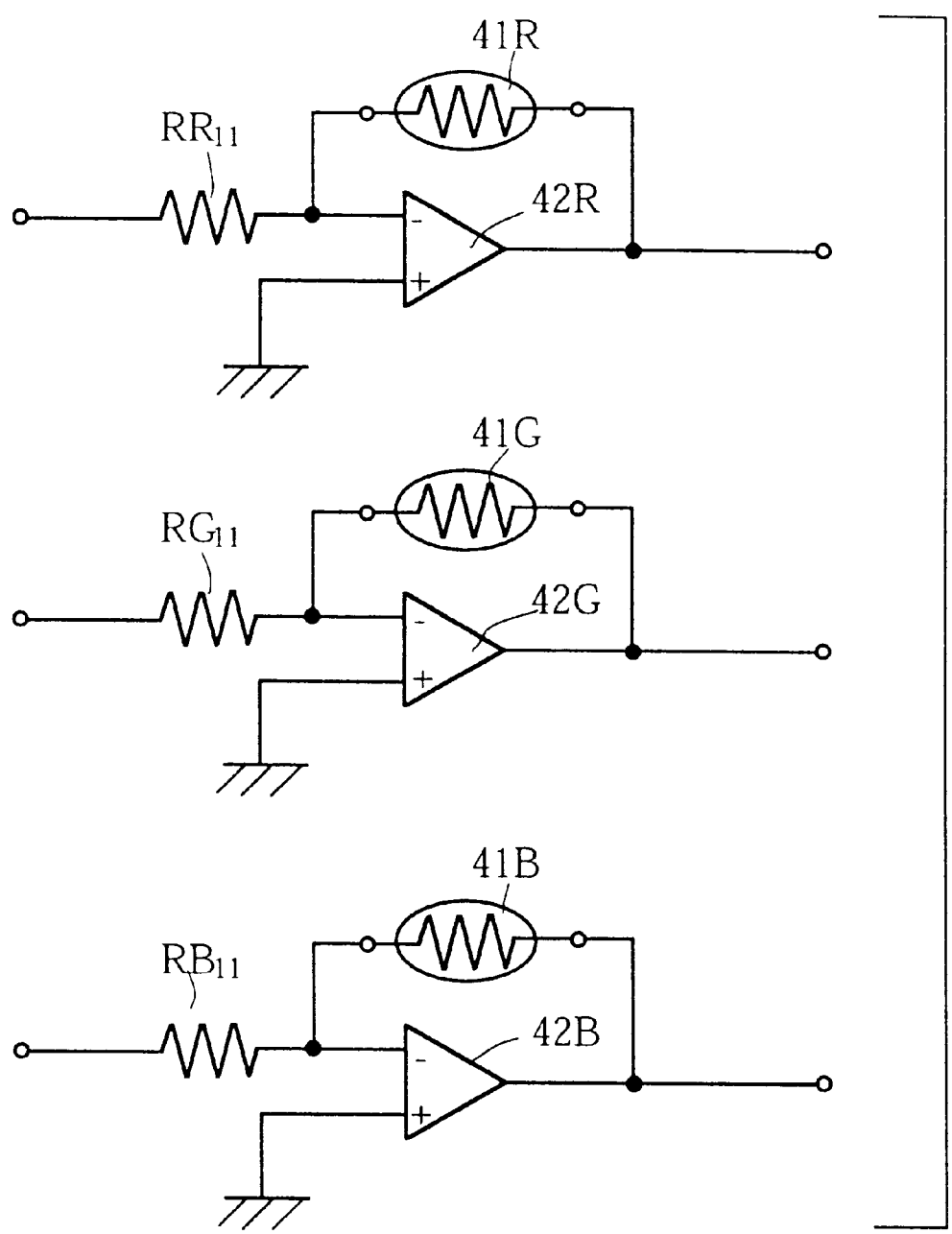
FIG. 9 is a circuit diagram showing an amplifying section according to another embodiment.

Specifically, as shown in FIGS. 7 and 8, it is possible to provide the head substrate 4 with three CdS cells 41R, 41G and 41B instead of a control chip 6. These CdS cells are provided between the output terminal and inverting terminal of the operational amplifiers 42R, 42G and 42B, respectively, as shown in FIG. 9. The inverting terminals of the respective operational amplifiers 42R, 42G and 42B are connected to resistors $RR_{11}$, $RG_{11}$ and $RB_{11}$, while the noninverting terminals of the operational amplifiers are connected to ground. Here, the operational amplifiers 42R, 42G and 42B and the resistors $RR_{11}$, $RG_{11}$ and $RB_{11}$ are mounted on a substrate arranged outside the image reading apparatus 1. The CdS cells 41R, 41G and 41B are connected to the operational amplifiers 42R, 42G and 42B via the connector 15 and the wiring pattern formed on the head substrate 4. The inverting terminal of the operational amplifier 42R receives the red-image signals transmitted from the pad AOR2 of the image sensor chip 5 via the connector 15 and the resistor $RR_{11}$. Similarly, the inverting terminal of the operational amplifier 42G receives the green-image signals transmitted from the pad AOG2 of the image sensor chip 5 via the connector 15 and the resistor $RG_{11}$, while the inverting terminal of the operational amplifier 42B receives the blue-image signals transmitted from the pad AOB2 of the image sensor chip 5 via the connector 15 and the resistor $RB_{11}$. The red-, green- and blue-image signals amplified by the operational amplifiers 42R, 42G and 42B are transmitted to a processing circuit (not shown).

Now, it is assumed that the input voltage of the operational amplifier 42R is $v_1$, its output voltage is $v_2$, the resistance of the resistor $RR_{11}$, is $R_{11}$, and the resistance of the CdS cell 41R is R when the luminosity of the cold-cathode tube 7 is E. Further, it is assumed that the saturation value of the luminosity of the cold-cathode tube 7 is Es, and the resistance of the CdS cell 41R is Rs when the luminosity of the cold-cathode tube 7 is saturated Then, the following equations hold.

$$v_2 = (R/R_{11})v_1 \quad (6)$$

$$R = Rs(E/Es)^{-\gamma} \quad (7)$$

The equations (6) and (7) lead to $$v_2 = (Rs/R_{11})(E/Es)^{-\gamma}v_1 \quad (8)$$

As can be seen from the equation (8), when use is made of a CdS cell 41 whose γ value is one (1), the output voltage $v_2$ is constant when the input voltage $v_1$ varies in proportion to the luminosity E of the cold-cathode tube 7. This holds for the operational amplifiers 42G and 42B. In this way, it is possible to keep the levels of the red-, green- and blue-image signals outputted from the operational amplifiers 42R, 42G and 42B even when the luminosity of the cold-cathode tube 7 varies.

Unlike the embodiment described above, the operational amplifiers 42R, 42G and 42B and the resistors $RR_{11}$, $RG_{11}$ and $RB_{11}$ may be arranged within the image reading apparatus 1. In this case, they may be mounted on the head substrate 4 or on an additional substrate separate from the head substrate 4.

Further, the light detecting means may be provided by a phototransistor, photodiode, CdS cell or the like. The amplifying means may be provided by a voltage control type amplifier, while the amplification controlling means may be provided by a negative-feedback amplifier utilizing an operational amplifier and the like.

Figure 10:
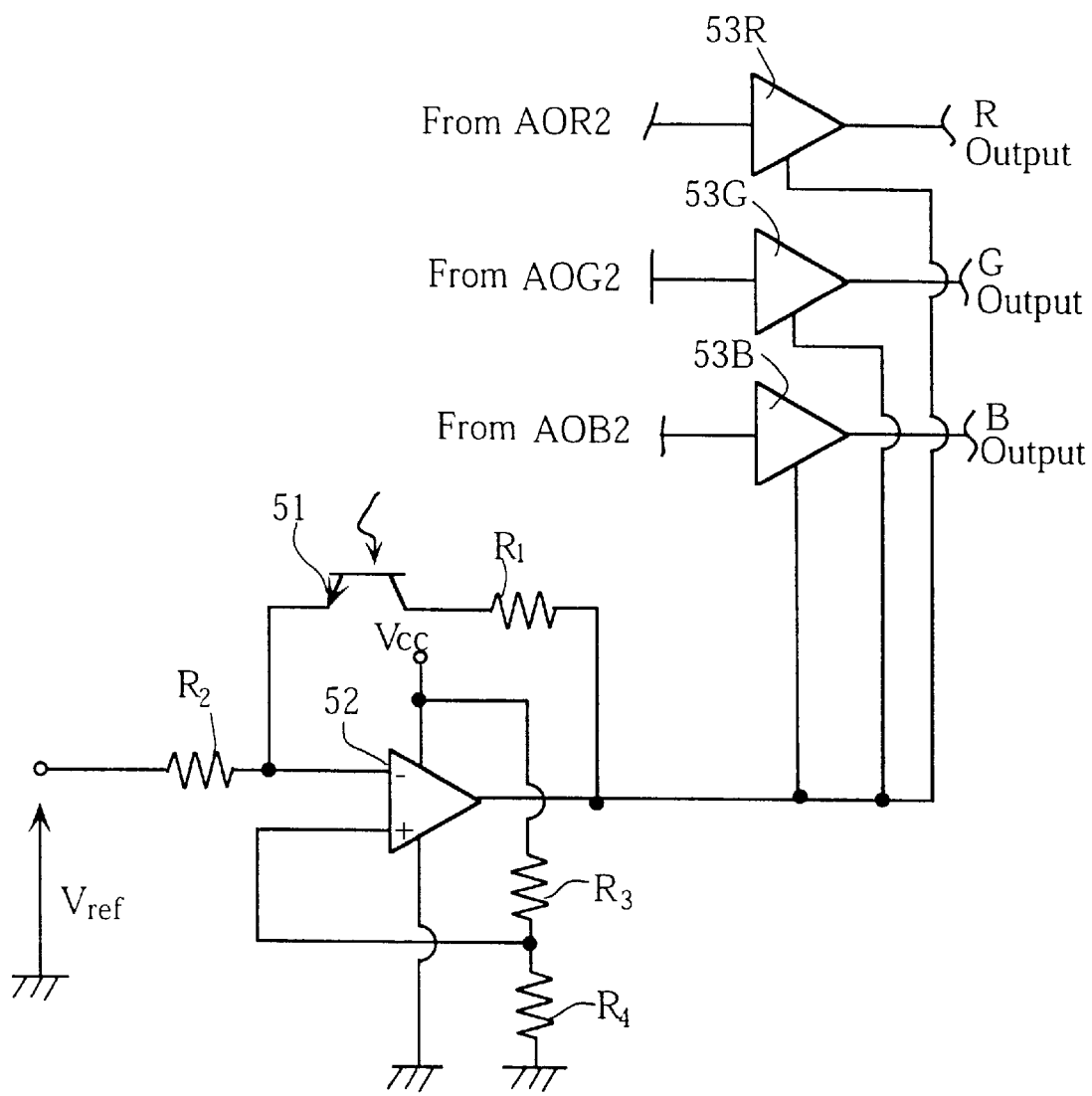
FIG. 10 is a circuit diagram showing an amplifying section according to still another embodiment.

Specifically, as shown in FIG. 10, the head substrate 4 may be provided with a phototransistor 51, an operational amplifier 52, three amplifiers 53R, 53G and 53B, and resistors $R_1$–$R_4$. The phototransistor 51 receives the light emitted by the cold-cathode tube 7. The amplification factors of the amplifiers 53R, 53G and 53B is controlled by the output voltage of the operational amplifier 52.

In the circuit shown in FIG. 10, the output terminal of the operational amplifier 52 is connected to an end of the resistor $R_1$ and to the control voltage terminals of the respective amplifiers 53R, 53G and 53B. The other end of the resistor $R_1$ is connected to the collector of the phototransistor 51. The emitter of the phototransistor 51 is connected to the inverting terminal of the operational amplifier 52 and to an end of the resistor $R_2$. The noninverting terminal of the operational amplifier 52 is connected to an end of the resistor $R_3$ and to an end of the resistor $R_4$. The other end of the resistor $R_3$ is connected to the power source Vcc. The other end of the resistor $R_4$ is connected to ground. The other end of the resistor $R_2$ receives a reference voltage Vref supplied by a reference voltage supply circuit (not shown).

The input terminals of the amplifiers 53R, 53G and 53B receive the red-, green- and blue-image signals transmitted from the pads AOR2, AOG2 and AOB2 of the image sensor chips 5. The red-, green- and blue-image signals outputted from the output terminals of the amplifiers 53R, 53G and 53B are transmitted outward of the image reading apparatus chip 1 via the connector 15.

The operational amplifier 52 is provided by an IC, while the three amplifiers 53R, 53G and 53B are incorporated in a single IC. The phototransistor 51 and the resistors $R_1$–$R_4$ are discrete devices.

The resistance between the collector and emitter of the phototransistor 51 varies in accordance with the luminous energy of the light emitted by the cold-cathode tube 7. The operational amplifier 52 functions as an inverting amplifier. A feedback circuit is made up of the resistor $R_1$ and the phototransistor 51 serially connected to each other. This feedback circuit is connected to the operational amplifier 52. Thus arranged negative feedback amplifier supplies control voltages to the control voltage terminals of the respective amplifiers 53R, 53G and 53B.

In the amplifier 53R, the red-image signals transmitted from the pad AOR2 of the image sensor chip 5 are amplified by an amplification factor corresponding to the control voltage supplied from the output terminal of the operational amplifier 52. In the amplifier 53G, the green-image signals transmitted from the pad AOG2 of the image sensor chip 5 are amplified by an amplification factor corresponding to the control voltage supplied from the output terminal of the operational amplifier 52. In the amplifier 53B, the blue-image signals transmitted from the pad AOB2 of the image sensor chip 5 are amplified by an amplification factor corresponding to the control voltage supplied from the output terminal of the operational amplifier 52.

Now, it is assumed that the resistance of the feedback circuit (made up of the phototransistor 51 and resistor $R_1$) is Rf, that the resistances of the resistors $R_2$, $R_3$ and $R_4$ are $R_2$, $R_3$ and $R_4$, respectively, and that the operational amplifier 52 is an ideal device. Then, the control voltage $V_O$ supplied from the output terminal of the operational amplifier 52 is expressed by the following equation.

$$V_O = -\frac{R_f}{R_2} \cdot V_{ref} + \frac{R_4(R_f + R_2)}{R_2(R_3 + R_4)} \cdot V_{cc} \quad (9)$$

In the right-hand side of the equation (9), Rf is the only variable. From the equation (9), the following equation is obtained.

$$V_O = \frac{1}{R_2} \cdot \left( \frac{R_4 \cdot V_{cc}}{R_3 + R_4} - V_{ref} \right) \cdot R_f + \frac{R_4 \cdot V_{cc}}{R_3 + R_4} \quad (10)$$

The reference voltage Vref is set so that the following relation is satisfied.

$$V_{ref} < \frac{R_4 \cdot V_{cc}}{R_3 + R_4} \quad (11)$$

Figure 11:
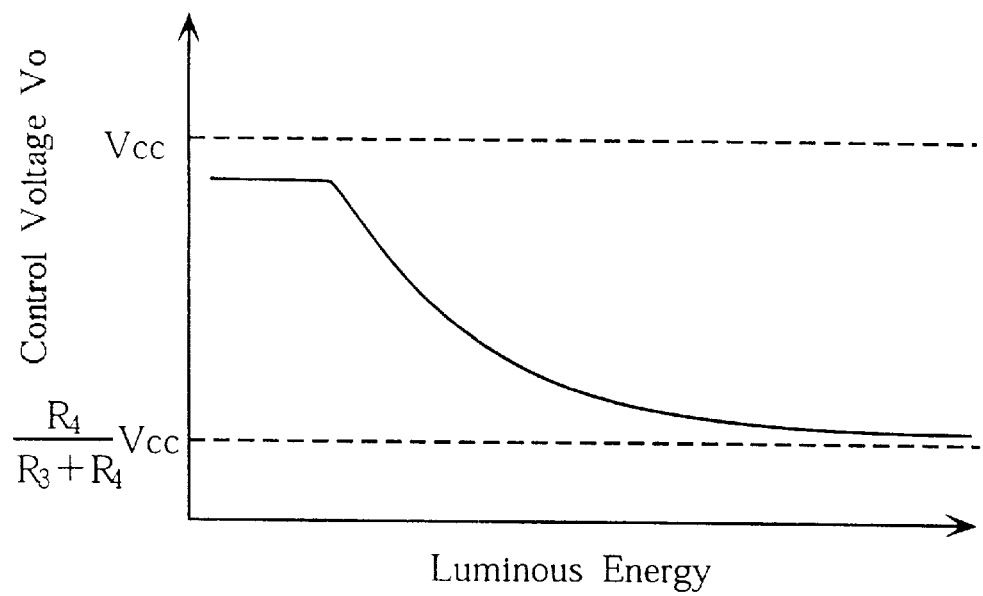
FIG. 11 is a graph illustrating the relationship between the luminous energy received by a phototransistor shown in FIG. 10 and the control voltage supplied by an operational amplifier shown in FIG. 10.

Thus, as can be seen from the equation (10), the control voltage $V_O$ is always greater than $(R_4 \times V_{cc})/(R_3+R_4)$. The resistance between the collector and emitter of the phototransistor 51 becomes smaller as the luminous energy of the light emitted by the cold-cathode tube 7 increases. As shown in FIG. 11, the control voltage $V_O$ becomes smaller as the luminous energy of the light emitted by the cold-cathode tube 7 increases.

The above-mentioned resistor $R_1$ of the feedback circuit is provided for adjusting the inclination of the graph shown in FIG. 11.

Figure 12:
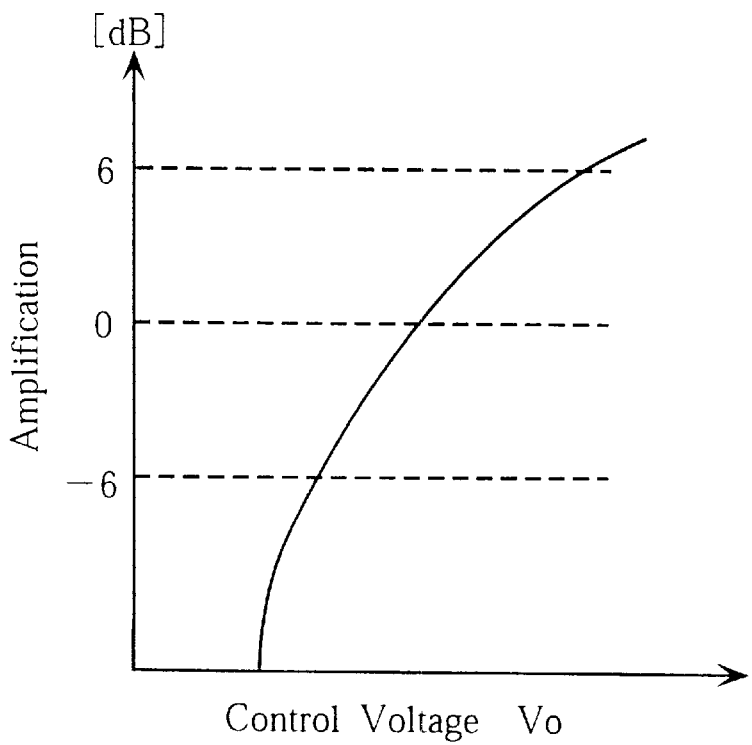
FIG. 12 is a graph illustrating the relationship between the above control voltage and the amplification factor of an amplifier shown in FIG. 10.
Figure 13:
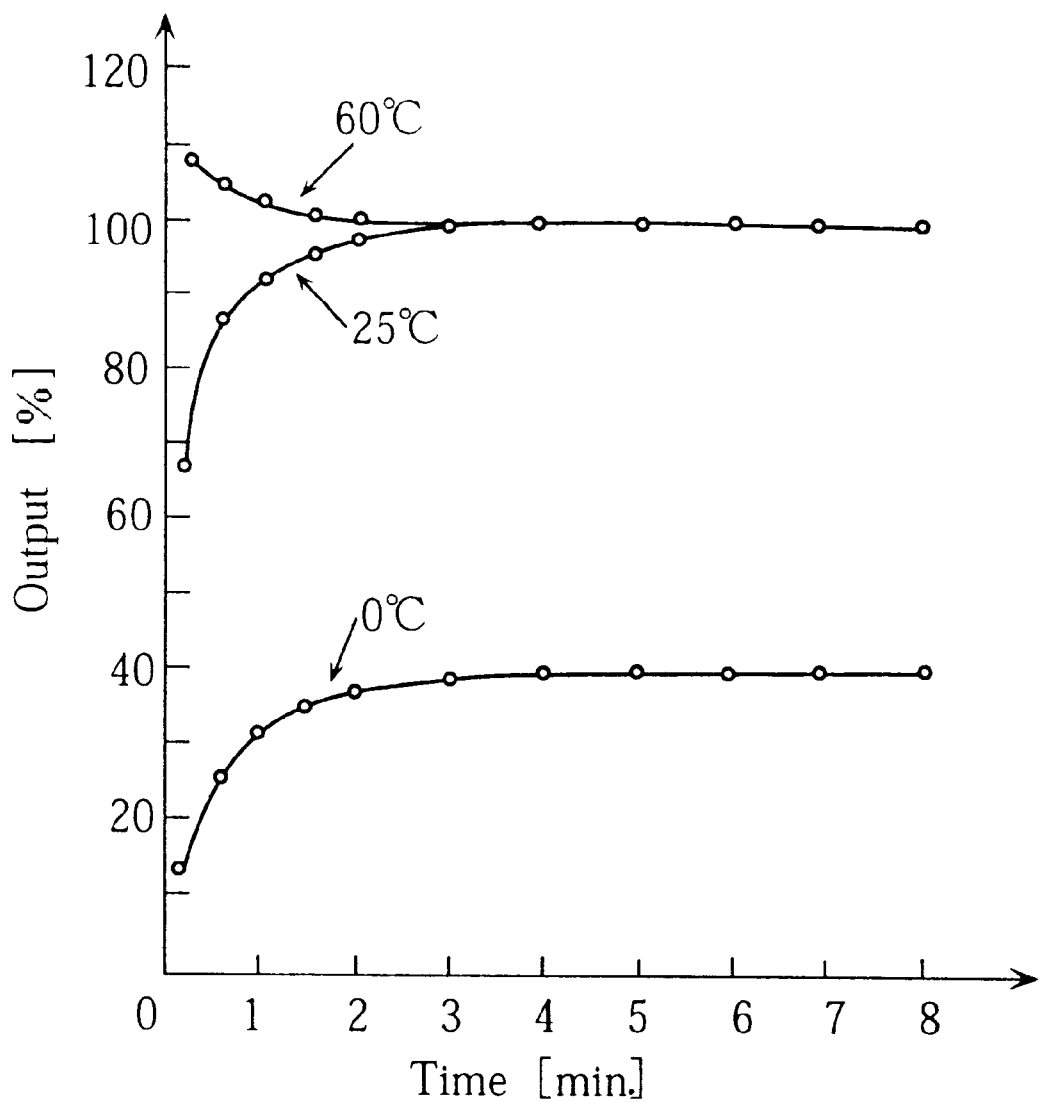
FIG. 13 is a graph showing the time-output characteristic of a cold-cathode tube.

As shown in FIG. 12, the amplification factors of the respective amplifiers 53R, 53G and 53B become greater as the control voltage $V_O$ increases.

When a greater amount of luminous energy is supplied to the phototransistor 51 from the cold-cathode tube 7, the resistance between the collector and emitter of the phototransistor 51 becomes smaller. Accordingly, the resistance of the feedback circuit decreases, which results in an increase in the feedback ratio of the feedback circuit. Then, the amplification factor of the operational amplifier 52 decreases, so that the control voltage $V_O$ outputted from the amplifier 52 becomes smaller (FIG. 11). As a result, the amplification factors of the respective amplifiers 53R, 53G and 53B decrease, as shown in FIG. 12. In this way, the variation of the luminous energy emitted by the cold-cathode tube 7 is cancelled out. Thus, the output level of the amplifiers 53R, 53G and 53B is maintained even when the luminous energy of the cold-cathode tube 7 varies.

Instead of the phototransistor 51, it is possible to use a photodiode or CdS cell for the light detecting means.

The phototransistor 51, operational amplifier 52, amplifiers 53R, 53G and 53B, and resistors $R_1$–$R_4$ may be mounted on an additional printed circuit board arranged within the image reading apparatus 1.

Alternatively, the operational amplifier 52, amplifiers 53R, 53G and 53B, and resistors $R_1$–$R_4$ may be mounted on an additional printed circuit board arranged outside the image reading apparatus 1. In this case, the detection signals from the phototransistor 51 may be transmitted to the inverting terminal of the operational amplifier 52 via the connector 15.

The preferred embodiments of the present invention being thus described, it is obvious that the same may be varied in many ways.

Such variations are not to be regarded as a departure from the spirit and scope of the present invention, and all such modifications as would be obvious to those skilled in the art are intended to be included within the scope of the following claims.

What is claimed is:

1. An image sensor for reading images on an image carrying member irradiated by a part of light emitted from a light source and passing through a first light path, said light source having another part of the light emitted from said light source directed through a second light path, said first and second light paths being formed separately, said image sensor comprising:

a substrate;

an array of image sensor chips for receiving reflected light from said first light path from the image carrying member for output of image signals in accordance with luminous energy of the reflected light; and light detecting means for directly receiving said another part of the light from said second light path for output of a detection signal in accordance with luminous energy of directly received said another part of the light;

wherein the array of image sensor chips and the light detecting means are mounted on a common said substrate, the light detecting means being out of alignment with the array of image sensor chips.

2. The image sensor according to claim 1, wherein each of the image sensor chips includes a plurality of light receiving elements each having predetermined temperature characteristics, the light detecting means comprising a phototransistor having temperature characteristics which are generally similar to those of the light receiving element.

3. The image sensor according to claim 1, further comprising: amplifying means for amplifying the image signals from the image sensor chips, the amplifying means having a variable amplification factor; and amplification controlling means for varying the amplification factor of the amplifying means on the basis of the detection signal from the light detecting means.

4. The image sensor according to claim 3, further comprising memorizing means for storing correction data which include reference image signals from the image sensor chips and a reference detection signal from the light detecting means, the reference image signals and reference detection signal being obtained by a test reading operation;

wherein the amplification controlling means adjusts the amplification factor of the amplifying means for an actual reading operation on the basis of a detection signal from the light detecting means and the correction data stored in the memorizing means, so that the amplifying means provides amplified image signals having predetermined levels.

5. The image sensor according to claim 3, further comprising amplification fixing means for forcing the amplification factor of the amplifying means to be set at a predetermined value.

6. The image sensor according to claim 3, wherein the amplifying means, the light detecting means and the amplification controlling means are incorporated in a single control chip.

7. The image sensor according to claim 3, wherein each of the image sensor chips supplies red-, green- and blue-image signals, the amplifying means including a first amplifier, a second amplifier and a third amplifier which correspond to the red-, green- and blue-image signals, respectively, the amplification controlling means being arranged to separately adjust amplification factors of the first to the third amplifiers.

8. The image sensor according to claim 3, wherein the light detecting means and the amplification controlling means are integrally provided by CdS cells each having a resistance which varies in proportion to luminosity of the light source.

9. The image sensor according to claim 8, wherein the amplifying means comprises operational amplifiers each having an output terminal and an inverting terminal, each of the CdS cells being arranged between the output terminal and inverting terminal of a respective one of the operational amplifiers.

10. The image sensor according to claim 9, wherein each of the image sensor chips supplies red-, green- and blue-image signals, the operational amplifiers corresponding to the red-, green- and blue-image signals, respectively, the CdS cells corresponding to the red-, green- and blue-image signals, respectively.

11. The image sensor according to claim 3, wherein the amplification controlling means comprises a negative feedback amplifier including a feedback circuit in which the light detecting means is arranged.

12. The image sensor according to claim 11, wherein a variation of the luminous energy of the light source is cancelled out by a variation of the amplification factor of the amplifying means.

13. The image sensor according to claim 11, wherein the negative feedback amplifier includes an operational amplifier having an output terminal and an inverting terminal, the feedback circuit including a resistor connected in series to the light detecting means, the feedback circuit being arranged between the output terminal and the inverting terminal of the operational amplifier.

14. The image sensor according to claim 11, wherein each of the image sensor chips supplies red-, green- and blue-image signals, the amplifying means including a first amplifier, a second amplifier and a third amplifier which correspond to the red-, green- and blue-image signals, respectively, the light detecting means and the amplification controlling means being provided in common for the red-, green- and blue-image signal.

15. An image reading apparatus for an image carrying member, comprising:

a light source for emitting light;

a first light path extending from the light source towards the image carrying member, part of the light emitted from the light source passing through the first light path to irradiate images on the image carrying member thereby becoming reflected light;

an array of image sensor chips formed on a common substrate for receiving the reflected light from the image carrying member for output of image signals in accordance with luminous energy of the reflected light;

a second light path extending from the light source towards the common substrate separately from the first light path;

light detecting means for directly receiving another part of the light emitted from the light source for output of a detection signal in accordance with luminous energy of the directly received another part of the light, said another part of the light passing through the second light path;

amplifying means for amplifying the image signals from the image sensor chips, the amplifying means being variable in amplification factor; and amplification controlling means for varying the amplification factor of the amplifying means on the basis of the detection signal from the light detecting means;

wherein the light detecting means is also mounted on the common substrate out of alignment with the array of image sensor chips.

16. The image reading apparatus according to claim 15, wherein the light source comprises a cold-cathode tube.

17. The image reading apparatus according to claim 15, wherein the light detecting means, the amplifying means and the amplification controlling means are incorporated in a single control chip, and the common substrate is a printed circuit board.

18. The image reading apparatus according to claim 17, further comprising a housing for supporting the light source and the printed circuit board, the housing being formed with a through-hole for leading the light emitted from the light source to the control chip, the through-hole serving as the second light path.

* * * * *